United States Patent
Chu et al.

(10) Patent No.: US 9,806,995 B2
(45) Date of Patent: Oct. 31, 2017

(54) HARDWARE PERCENTILE LATENCY MEASUREMENT

(71) Applicant: Cisco Technology, Inc., San Jose, CA (US)

(72) Inventors: Kit Chiu Chu, Fremont, CA (US); Jeff Hill, San Jose, CA (US); Thomas J. Edsall, Los Gatos, CA (US); Mohammadreza Alizadeh Attar, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 80 days.

(21) Appl. No.: 14/480,482

(22) Filed: Sep. 8, 2014

(65) Prior Publication Data

US 2015/0124640 A1 May 7, 2015

Related U.S. Application Data

(60) Provisional application No. 61/900,333, filed on Nov. 5, 2013.

(51) Int. Cl.
*H04L 12/801* (2013.01)
*H04L 12/701* (2013.01)
(Continued)

(52) U.S. Cl.
CPC .......... *H04L 45/28* (2013.01); *H04L 12/4633* (2013.01); *H04L 12/4641* (2013.01); *H04L 41/0654* (2013.01); *H04L 43/0811* (2013.01); *H04L 43/0852* (2013.01); *H04L 43/0894* (2013.01); *H04L 43/16* (2013.01); *H04L 45/02* (2013.01); *H04L 45/22* (2013.01);
(Continued)

(58) Field of Classification Search
CPC ... H04L 47/125; H04L 45/24; H04L 45/0858; H04L 43/045; H04L 43/12; H04L 43/106; H04L 45/00; H04L 43/00; H04W 28/16
USPC ....... 714/748; 370/235, 329, 352 M, 395.52, 370/252, 311, 230, 503, 236, 352; 704/214
See application file for complete search history.

(56) References Cited

U.S. PATENT DOCUMENTS 6,230,231 B1   5/2001  DeLong et al.
6,769,033 B1   7/2004  Bass et al.
(Continued)

FOREIGN PATENT DOCUMENTS

WO   WO 2006/101668   9/2006
WO   WO 2009/115480   9/2009

OTHER PUBLICATIONS

International Search Report and Written Opinion for PCT/US2014/063555, mailed Feb. 5, 2015, 10 pages.
(Continued)

*Primary Examiner* — Alpus H Hsu
*Assistant Examiner* — Camquyen Thai
(74) *Attorney, Agent, or Firm* — Polsinelli PC

(57) ABSTRACT

The subject technology addresses the need in the art for directly measuring a maximum latency number with respect to a percentile of network traffic, which a network operator may utilize as an performance indication or metric. Given a traffic percentile, a tracking algorithm in accordance with embodiments described herein may be implemented in hardware and/or software to determine a maximum latency for this specific percentile of traffic.

17 Claims, 4 Drawing Sheets

(51) Int. Cl.

| | |
|---|---|
| *G06F 15/16* | (2006.01) |
| *H04L 12/703* | (2013.01) |
| *H04L 12/26* | (2006.01) |
| *H04L 12/46* | (2006.01) |
| *H04L 12/741* | (2013.01) |
| *H04L 29/12* | (2006.01) |
| *H04L 12/751* | (2013.01) |
| *H04L 29/06* | (2006.01) |
| *H04L 12/58* | (2006.01) |
| *H04L 29/08* | (2006.01) |
| *H04L 12/707* | (2013.01) |
| *H04L 12/709* | (2013.01) |
| *H04L 12/723* | (2013.01) |
| *H04L 12/24* | (2006.01) |
| *H04L 12/931* | (2013.01) |

(52) U.S. Cl.
CPC ............ *H04L 45/245* (2013.01); *H04L 45/50* (2013.01); *H04L 45/74* (2013.01); *H04L 45/745* (2013.01); *H04L 49/70* (2013.01); *H04L 51/14* (2013.01); *H04L 61/2503* (2013.01); *H04L 61/2592* (2013.01); *H04L 67/10* (2013.01); *H04L 69/22* (2013.01)

(56) References Cited

U.S. PATENT DOCUMENTS

| | | | |
|---|---|---|---|
| 7,379,459 B2 | 5/2008 | Ohnishi | |
| 7,742,406 B1 | 6/2010 | Muppala | |
| 7,940,763 B1 | 5/2011 | Kastenholz | |
| 8,190,843 B1* | 5/2012 | de Forest | G06F 13/28 711/154 |
| 8,874,876 B2 | 10/2014 | Bhadra et al. | |
| 9,053,070 B1* | 6/2015 | Arguelles | G06F 15/177 |
| 2003/0123462 A1 | 7/2003 | Kusayanagi | |
| 2006/0183488 A1* | 8/2006 | Billhartz | G01S 13/765 455/456.5 |
| 2007/0133566 A1* | 6/2007 | Copps | H04L 1/1887 370/395.52 |
| 2008/0243495 A1* | 10/2008 | Anandakumar | G10L 19/005 704/214 |
| 2009/0086629 A1* | 4/2009 | Zhang | H04W 28/16 370/230 |
| 2009/0238179 A1 | 9/2009 | Samprathi | |
| 2011/0007638 A1* | 1/2011 | Xu | H04W 80/06 370/252 |
| 2011/0213894 A1* | 9/2011 | Silberstein | G06F 17/30557 709/232 |
| 2011/0268118 A1 | 11/2011 | Schlansker et al. | |
| 2011/0274053 A1* | 11/2011 | Baik | H04W 72/1242 370/329 |
| 2011/0286324 A1 | 11/2011 | Bellagamba et al. | |
| 2013/0100810 A1* | 4/2013 | Slothouber | H04L 43/0882 370/235 |
| 2013/0107889 A1 | 5/2013 | Barabash et al. | |
| 2013/0121172 A1* | 5/2013 | Cheng | H04W 52/0222 370/252 |
| 2013/0155846 A1 | 6/2013 | Ramachandran et al. | |
| 2013/0311637 A1 | 11/2013 | Kamath et al. | |
| 2013/0322453 A1 | 12/2013 | Allan | |
| 2014/0064278 A1 | 3/2014 | Santos et al. | |
| 2014/0086253 A1 | 3/2014 | Yong | |
| 2014/0269705 A1 | 9/2014 | DeCusatis et al. | |
| 2014/0269710 A1 | 9/2014 | Sundaram et al. | |
| 2015/0009992 A1 | 1/2015 | Zhang | |
| 2015/0058470 A1 | 2/2015 | Duda | |
| 2015/0073920 A1* | 3/2015 | Pashkevich | H04W 4/206 705/14.71 |
| 2015/0082418 A1 | 3/2015 | Gu | |
| 2015/0103679 A1 | 4/2015 | Tessmer et al. | |
| 2015/0124590 A1 | 5/2015 | Chu et al. | |
| 2015/0124821 A1 | 5/2015 | Chu et al. | |
| 2015/0124822 A1 | 5/2015 | Chu et al. | |
| 2015/0127701 A1 | 5/2015 | Chu et al. | |
| 2015/0188769 A1 | 7/2015 | Gu | |
| 2015/0222516 A1* | 8/2015 | Deval | H04L 67/1029 370/253 |

OTHER PUBLICATIONS

Cisco Systems, Inc., "Cisco Nexus 1000V VXLAN Configuration Guide, Release 4.2(1)SV2(2.1), Chapter 1, Information About VXLANs," Jun. 21, 2013, 6 pages.

Onisick, Joe, "VXLAN Deep Dive," Genesis Framework, Wordpress, Nov. 6, 2012, 8 pages.

VMware, Inc., "VMware Network Virtualization Design Guide, Technical White Paper," Jan. 2013, 25 pages.

\* cited by examiner

FIG. 2A

Table 1 (205):

| Data A | A_n |
| --- | --- |
| Data B | B_n |
| Data C | C_n |
| ... | ... |
| Data N | N_n |

Table 2 (210):

| Data A' | A'_n |
| --- | --- |
| Data B' | B'_n |
| Data C' | C'_n |
| ... | ... |
| Data N' | N'_n |

Table X (215):

| Data A* | A*_n |
| --- | --- |
| Data B* | B*_n |
| Data C* | C*_n |
| ... | ... |
| Data N* | N*_n |

FIG. 2B (250)

| L% | packets | pkt_interval | Average Th % | variance | std dev |
| --- | --- | --- | --- | --- | --- |
| 0.99 | 100000 | 1000 | 0.989 | 6.90E-07 | 8.30E-04 |
| 0.99 | 1000000 | 10000 | 0.99 | 1.72E-07 | 4.10E-04 |
| 0.95 | 100000 | 1000 | 0.951 | 5.24E-06 | 2.29E-03 |
| 0.95 | 1000000 | 1000 | 0.95 | 7.02E-06 | 2.63E-03 |
| 0.95 | 1000000 | 10000 | 0.949 | 6.13E-07 | 7.80E-04 |

HARDWARE PERCENTILE LATENCY MEASUREMENT

CLAIM TO PRIORITY

This application claims priority to U.S. provisional application No. 61/900,333, filed on Nov. 5, 2013, which is expressly incorporated by reference herein in its entirety.

BACKGROUND

Network traffic latency may have a direct impact on performance for a large number of applications. Monitoring network traffic latency would enable a network operator(s) to identify an issue(s) and take corrective actions, if necessary. Some metrics provided by given network hardware may provide minimum, maximum and average latency values, which may not be directly used to identify issues

BRIEF DESCRIPTION OF THE DRAWINGS

The embodiments of the present technology will hereinafter be described in conjunction with the appended drawings, provided to illustrate and not to limit the technology, wherein like designations denote like elements, and in which:

FIGS. 2A and 2B illustrate an example set of tables and an example set of data that may be stored in a respective table for tracking latency for packet(s) in accordance with some embodiments of the subject technology.

DETAILED DESCRIPTION

Systems and methods in accordance with various embodiments of the present disclosure may overcome one or more deficiencies experienced in existing approaches to monitoring network activity and troubleshooting network issues.

Overview

Embodiments of the subject technology provide for receiving a set of packets at the network interface; determining a number of packets below a current threshold value; determining whether a first ratio of packets below the current threshold value is less than a target threshold value in which the target threshold value indicates a latency percentile; and increasing the current threshold value based on at least a product of a maximum latency value with a second ratio between 1) a difference of the target threshold value and the first ratio, and 2) a gain setting in which the gain setting indicates a magnitude for adjusting the current threshold value.

Description of Example Embodiments

The disclosed technology addresses the need in the art for directly measuring a maximum latency number with respect to a percentile of network traffic, which a network operator may utilize as an performance indication or metric. Given a traffic percentile, a tracking algorithm in accordance with embodiments described herein may be implemented in hardware and/or software to determine a maximum latency for this specific percentile of traffic.

In at least one embodiment, each packet that enters into the network fabric is given an initial timestamp corresponding to a time in which the packet entered the network fabric. Before the packet leaves the network fabric and is transmitted to its destination, an amount of latency may be determined based on a difference between the initial timestamp and a time in which the packet arrived at a last network element (e.g., the network element before being transmitted to the destination) in the network fabric. Each timestamp is then removed as the packet leaves the network fabric and transmitted to the destination computer or device. As used herein, the phrase "network fabric" refers to a one or more network elements, forming a network, including switches, routers, servers, storage devices, or one or more components of a network device such as one or more network ports of a switch or router, etc.

Example Network Environment

Figure 1:
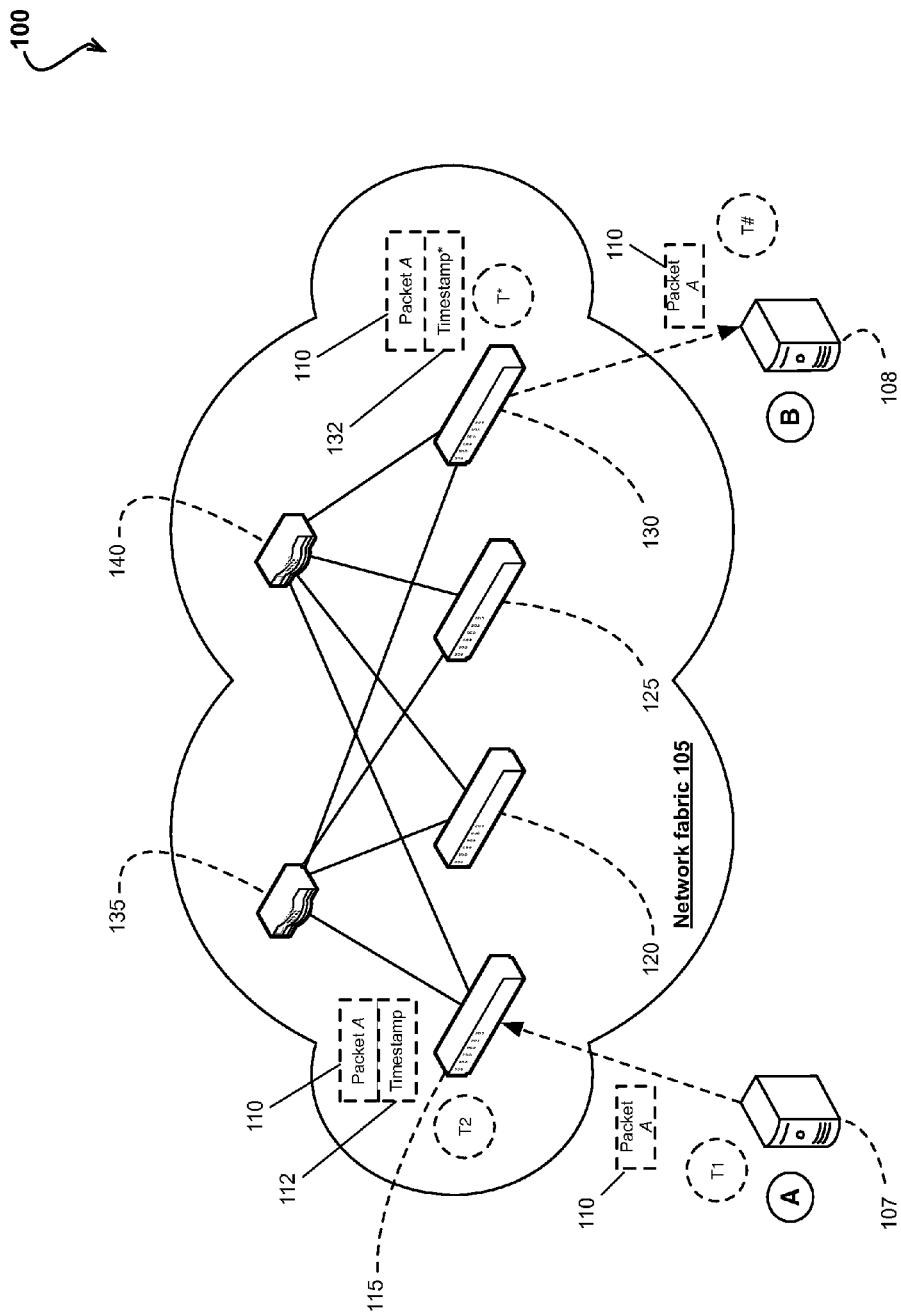
FIG. 1 shows an example network environment including several network elements or nodes (e.g., network devices such as switches, routers, servers, storage device, etc.) in accordance with some embodiments of the subject technology.

FIG. 1 shows an example network environment 100 including several network elements or nodes (e.g., network devices such as switches, routers, servers, storage device, etc.). In the example of FIG. 1, a client computer 107 ("A") represents a starting point for a packet 110 ("Packet A") that is transmitted from the client computer 107 into a network fabric 105. The network fabric in FIG. 1 includes network elements 115, 120, 125, 130, 135 and 140 that form a network for forwarding the packet 110 to its intended destination at a client computer 108 representing a destination point for the packet 110. For the sake of simplicity and for clarity of discussion, a single packet is described in the example of FIG. 1. However, it is appreciated that embodiments described herein are applicable to multiple packets that are transmitted from one or more source computers or devices and received, respectively, by one or more intended destination computers or devices.

As illustrated in FIG. 1, at an initial time T1, the packet 110 is transmitted into the network fabric 105 and received by a network element 115 (e.g., a switch or router). A timestamp 112 representing a time in which the packet 110 was received at the network element 115 may be appended (or included or inserted therein) to the packet 110.

Depending on information included in the packet 110, the packet 110 may be forwarded to different network elements in the network fabric 105. For instance, the packet 110 may be forwarded to network element 135, and then sent to the network element 130. Alternatively, the packet 110 may be forwarded to the network element 140 and then sent to the network element 130. It is appreciated that other paths for forwarding the packet 110 to one or other network elements to eventually reach the network element 130 may be provided and still be within the scope of the subject technology.

At a subsequent time T', the packet 110 is received by the network element 130, which represents the last network element (e.g., one hop away) from the intended destination at the client computer 108 ("B"). As shown, a timestamp 132 including information, corresponding to a time that the packet 110 was received, may be appended or inserted into the packet 110. The network element 130, in at least one embodiment, may use the information included in the timestamp 132 and calculate a latency value as described further herein. The latency value may then be, in at least one embodiment, stored in a table (or similar data structure)

including information or data for tracking and adjusting a threshold latency value that represents a desired or target latency value.

Example Measurement Types

The disclosed technology addresses the need in the art for directly measuring a maximum latency number with respect to a percentile of network traffic, which a network operator may utilize as an performance indication or metric. Given a target traffic percentile (e.g., $90^{th}$ percentile), a tracking algorithm may be implemented in hardware and/or software to determine a maximum latency for this specific percentile of traffic.

In some examples, three measuring types may be provided by the subject technology: 1) average latency & variance, 2) 90% latency and 3) histogram.

For average latency & variance, the subject technology (e.g., implemented as hardware components in some examples) may maintain 4 values for up to 576 separate records per port. The record entries in a table may include values for maximum, accumulation, sum of square and packet count.

For 90% latency, for N number of packets, the subject technology (e.g., implemented as hardware components in some examples) will determine a threshold, Th, in which L % of packets had a latency less than Th and (1−L) % had a latency equal to or greater than Th. There are up to 576 separate records for each port. The record entries in a table may include values for the following: Th (e.g., threshold), Pktcnt_above (e.g., packet count above the threshold), Pktcnt_below (e.g., packet count below the threshold).

For a histogram, the subject technology (e.g., implemented as hardware components in some examples) maintains up to 576 histograms. Each histogram has 48 buckets in at least one embodiment and bucket boundaries are defined via a 49 element register bank according to one hardware implementation. A histogram value is one of following options in some examples:
  1) NS_ingress [in|out] to NS_egress [in|out]
  2) Packet input to packet output (time spent in chip)
  3) Bandwidth based on software defined time interval Other ways to measure latency may include the following techniques. In one example, a moving average of top ten latency values may be used. For example, the following steps may be performed in accordance with this technique:
  1) take 100 samples of latency values;
  2) for the 100 samples of latency values, determine the top ten highest latency values;
  3) select the bottom or lowest latency value from among the top ten, which is equivalent to the 90% latency value;
  4) determine a running average per every 100 packets of the top ten latency values.

In another example, a sampling technique may be used to determine latency, which may include the following steps:
  1) sample 1 in 10 packets (instead of looking at each packet);
  2) over 1000 packets, 100 latency values will be determined per 10 samples, which can determine the top 10 latency values, top 1%, etc.

Example Tables

FIGS. 2A and 2B illustrate an example set of tables 200 and an example set of data 250 showing results for an execution of the 90% algorithm using random latency values and a uniform distribution. In at least one embodiment, a set of tables (e.g., 12 total tables) including tables 205, 210 and 215 may be provided for the network fabric 105 as discussed in FIG. 1 for keeping track of information regarding latency for different packets.

As described further herein, a respective table may be assigned to a respective input port of a network device (e.g., switch or router) and include information for a number of different packet flows simultaneously. In one example, the table may include information for 576 respective packet flows in 576 columns, which is dictated based on physical constraints of a network device (e.g., 16 slots×36 ports per slot in an interface for a total of 576 ports on the network device), and include 204 rows. As used herein, a packet flow may refer to a sequence of packets from a source computer to a destination. When a packet is received, a value associated with that input port to a corresponding packet flow may be updated in the table. It is appreciated, however, that each table may be based on any other type of traffic classification other than input port. In some examples, these types of traffic classifications may include the following: 1) QoS (quality of service); 2) DSCP (Differentiated services code point); 3) protocol; 4) subnet; 5) source switch and/or 6) any arbitrary type of classification.

As discussed before, for tracking $90^{th}$ percentile latency, for N number of packets, the subject technology may maintain up to 576 separate records for each port in a given table. The record entries in a table may include values for the following: Th (e.g., threshold), Pktcnt_above (e.g., packet count above the threshold), Pktcnt_below (e.g., packet count below the threshold).

For example, a table may contain the following values to track the $X^{th}$ percentile latency:
  Pkt_cnt—number of packets seen during the interval;
  Pkt_lo—number of packets with latency less than the current threshold;
  Threshold—current latency threshold for the $X^{th}$ percentile;
  Lofrac—current ratio of pkt_lo over pkt_cnt; and
  Lofrac_compare—result of comparing Lofrac with $X^{th}$ percentile.

In some examples, a set of hardware latency tables may be provided in accordance with the following details.
  1) As discussed before, 12 tables may be provided in which each table includes 576 columns×204 rows of data;
  2) For 90% and average/variance techniques described above: 1 table per port, 1 entry per TOR (top-of-rack);
  3) For histogram technique described above: Table entries are merged, 4 buckets per table; and
  4) Each entry can be individually configured for one of the 3 types (e.g., 90%, average/variance, and histogram) described above.

The example set of data 250 includes results for an execution of the 90% algorithm using random latency values and a uniform distribution in which an adjustment parameter (e.g., stepadjust described further below) has a value of 4 and a maximum latency value (e.g., latencyMax described further below) of 1000.

Example Process For $90^{th}$ Percentile Algorithm

In some examples, for executing a algorithm that determines a $90^{th}$ percentile latency (or any other percentile), the subject technology uses a configuration including information that describes the measure that will be taken (e.g., $90^{th}$ percentile), defines a number of packets that will be looked at (e.g., $2^N$ packets), and specifies a time interval (e.g., 1 minute, 5 minutes, 15 minutes, etc.) for executing the latency percentile algorithm.

In at least one embodiment, a 90% algorithm may be implemented in accordance with the following (as further illustrated in FIG. 3):

1) Run for an interval of $2^N$ packets (pkt_interval).
2) Count the number of packets below the current Th (pktcnt_lo).
3) The desired threshold or ratio is defined as L. In an example, where a $90^{th}$ percentile is sought, the target threshold or ratio L is also 90%.
4) Adjust Th as function of pktcnt_lo and pkt_interval:
   lofrac=pktcnt_lo/pkt_interval where lofrac represents the ratio of packets that were lower than the current threshold from the interval of packets that were received.

```
if (lofrac < L)
        Th = Th + latencyMax * ((L − lofrac)/stepadjust)
else
        Th = Th − latencyMax * ((lofrac − L)/stepadjust)
```

Where the stepadjust parameter determines how quickly to adjust (e.g., a gain setting), and the latencyMax represents a configurable maximum latency value.

5) Th will have a value between 0 or latencyMax.

Figure 3:
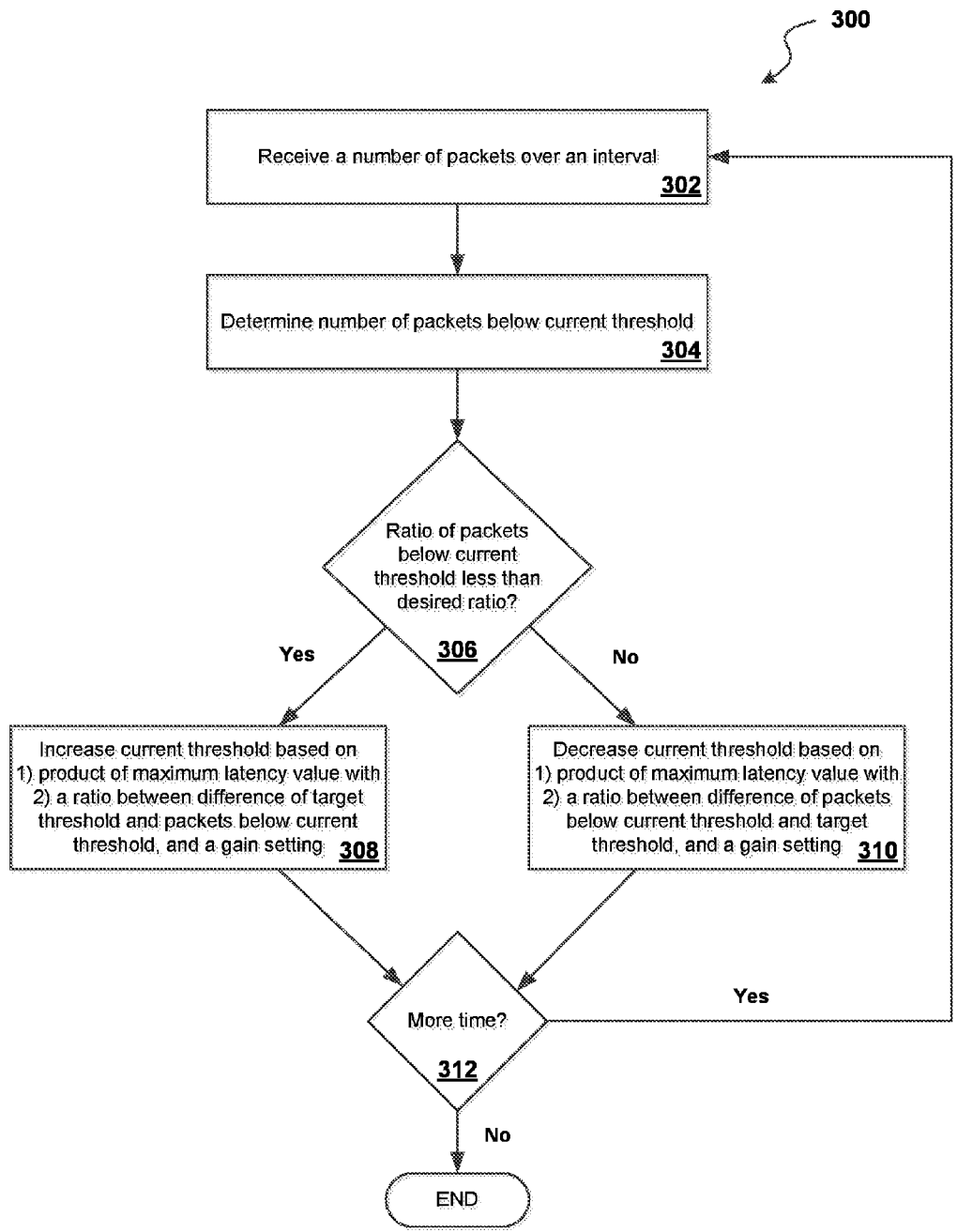
FIG. 3 illustrates steps of an example process for performing a latency percentile algorithm in accordance with some examples of the subject technology.

FIG. 3 illustrates steps of an example process 300 for performing a latency percentile algorithm in accordance with some examples of the subject technology. In some embodiments, the process 300 may be implemented by one or more computing devices or systems. For the process 300 illustrated in FIG. 3, for a set of N number of packets, a threshold, Th, will be determined in which L % of packets had a latency less than Th and (1−L) % had a latency equal to or greater than Th. In one embodiment, an initial value for the current threshold, Th, may be determined based on an predicted $50^{th}$ percentile latency value according to the expected latency throughout the network, or set to a predetermined value (e.g., 5 µs or microseconds). In some embodiments, the initial threshold may not be important to select since, over time, the threshold Th will converge to a more accurate value after being adjusted over several packet intervals. Thus, in at least one embodiment, the initial value for the current threshold may be selected using a random value.

At step 302, the process 300 receives a number of packets (e.g., $2^N$ packets) over an interval (e.g., denoted as pkt_interval). At step 304, the process 300 determines the number of packets below the current threshold (e.g., denoted as Th (pktcnt_lo)). In some examples, the target threshold (e.g., the desired ratio) is denoted as L. The threshold Th is adjusted based on a function of pktcnt_lo and pkt_interval based on the following pseudo-logic or code:

```
lofrac = pktcnt_lo/pkt_interval
    if (lofrac < L)
            Th = Th + latencyMax * ((L − lofrac)/stepadjust)
    else
            Th = Th − latencyMax * ((lofrac − L)/stepadjust)
Consequently, Th is clipped to 0 or latencyMax.
```

At step 306, it is determined whether a ratio of packets below the current threshold is less than the desired ratio. If so, at step 308, the current threshold is increased based on 1) a product of a maximum latency value with 2) a ratio between a difference of the target threshold and packets below the current threshold and a gain setting ("stepadjust"), which may be denoted as:

Th=Th+latencyMax*((L−lofrac)/stepadjust)

Alternatively, if the ratio of packets below the current threshold is not less than the desired ratio, at step 310 the current threshold is decreased based on 1) a product of the maximum latency value with 2) a ratio between difference of packets below the current threshold and target threshold and a gain setting, which may be denoted as:

Th=Th−latencyMax*((lofrac−L)/stepadjust)

At step 312, it is determined whether there is remaining time left to receive additional packets. If so, the process 300 returns to 302 to repeat the subsequent steps; otherwise, the process 300 ends.

As discussed before, over time (e.g., several packet intervals), the value for Th will converge to a more accurate latency representation of the network.

Figure 4:
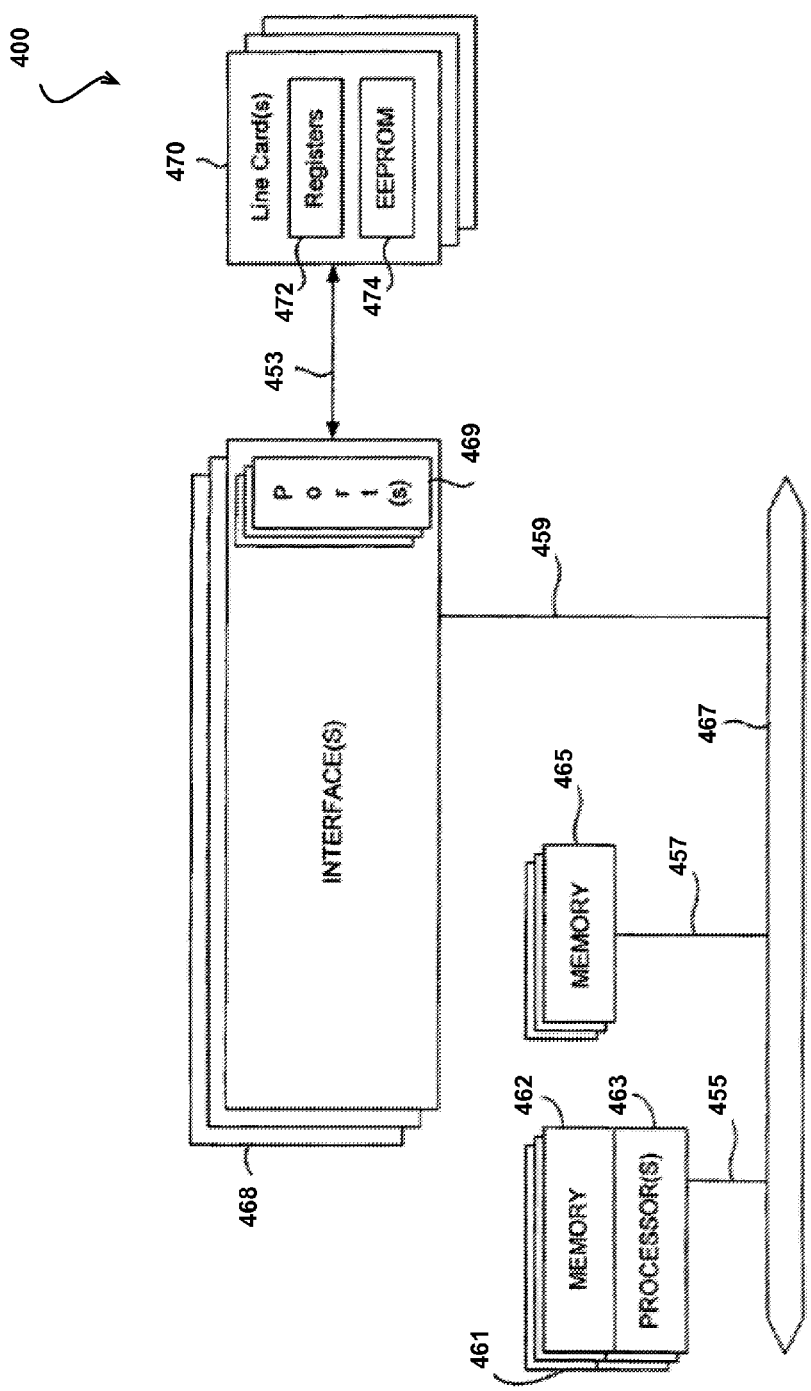
FIG. 4 illustrates an example of a network device that may be configured to implement some methods of the subject technology.

FIG. 4 illustrates an example of a network device that may be configured to implement some methods of the subject technology. Network device 400 includes a master central processing unit (CPU) 462, interfaces 468, and a bus 467 (e.g., a PCI bus). Generally, interfaces 468 include ports 469 appropriate for communication with the appropriate media. In some embodiments, one or more of interfaces 468 include at least one independent processor 474 and, in some instances, volatile RAM. Independent processors 474 may be, for example ASICs or any other appropriate processors. According to some such embodiments, these independent processors 474 perform at least some of the functions of the logic described herein. In some embodiments, one or more of interfaces 468 control such communications-intensive tasks as media control and management. By providing separate processors for the communications-intensive tasks, interfaces 468 allow the master microprocessor 462 efficiently to perform other functions such as routing computations, network diagnostics, security functions, etc.

The interfaces 468 are typically provided as interface cards (sometimes referred to as "linecards"). Generally, interfaces 468 control the sending and receiving of data packets over the network and sometimes support other peripherals used with the network device 400. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 462 may be responsible for implementing specific functions associated with the functions of a desired network device. According to some embodiments, CPU 462 accomplishes all these functions under the control of software including an operating system, and any appropriate applications software.

CPU 462 may include one or more processors 463. In an alternative embodiment, processor 463 is specially designed hardware for controlling the operations of network device 400. In a specific embodiment, a memory 461 (such as non-volatile RAM and/or ROM) also forms part of CPU 462. However, there are many different ways in which memory could be coupled to the system. Memory block 461 may be used for a variety of purposes such as, for example, caching and/or storing data, programming instructions, etc.

Regardless of network device's configuration, it may employ one or more memories or memory modules (such as, for example, memory block 465) configured to store data, program instructions for the general-purpose network operations and/or other information relating to the functionality of the techniques described herein. The program instructions may control the operation of an operating system and/or one or more applications, for example.

The various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, SAP®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN"). Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate storage media used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
   at least one processor;
   a network interface; and
   memory including instructions that, when executed by the at least one processor, cause the system to:
   receive a first set of packets at the network interface;
   determine a number of packets, from the first set of packets, that are received with a latency value below a current threshold value;

determine whether a first ratio of packets below the current threshold value is less than a target ratio value, wherein the target ratio value is provided as a latency percentile;

in response to determining the first ratio is less than the target ratio value, increment the current threshold value by a product of a maximum latency value, a difference of the target ratio value and the first ratio, and a gain setting, wherein the gain setting indicates a magnitude for adjusting the current threshold value; and in response to determining the first ratio is not less than the target ratio value, decrement the current threshold value by a product of a maximum latency value, a difference of the first ratio and the target ratio value, and a gain setting, wherein the gain setting indicates a magnitude for adjusting the current threshold value.

2. The system of claim 1, wherein the set of packets comprises an interval of packets, wherein the interval of packets represents an amount of packets received during a first period of time.

3. The system of claim 1, wherein the instructions further cause the at least one processor to:
determine whether a remaining period of time remains in a total amount of time for receiving packets.

4. The system of claim 3, wherein the instructions further cause the at least one processor to:
receive a second set of packets at the network interface.

5. The system of claim 1, wherein the set of packets are received at a respective port of the network interface, wherein the network interface includes a plurality of ports.

6. The system of claim 1, wherein the current threshold value comprises a predetermined value or a predicted median percentile latency value according to an expected latency throughout a network.

7. A computer-implemented method, comprising:
receiving a first set of packets at a network interface;
determining a number of packets, from the first set of packets, with a latency below a current threshold value;
determining whether a first ratio of packets below the current threshold value is less than a target ratio value, wherein the target ratio value is provided as a latency percentile;
in response to determining that the first ratio is less than the target ratio value, incrementing the current threshold value by a product of a maximum latency value, a difference between the target ratio value and the first ratio, and a gain setting, wherein the gain setting indicates a magnitude for adjusting the current threshold value; and
in response to determining that the first ratio is not less than the target ratio value, decrementing the current threshold value by a product of a maximum latency value, a difference between the first ratio and the target ratio value, and a gain setting, wherein the gain setting indicates a magnitude for adjusting the current threshold value.

8. The computer-implemented method of claim 7, wherein the set of packets comprises an interval of packets, wherein the interval of packets represents an amount of packets received during a first period of time.

9. The computer-implemented method of claim 7, further comprising:
determining whether a remaining period of time remains in a total amount of time for receiving packets.

10. The computer-implemented method of claim 9, further comprising:
receiving a second set of packets at the network interface.

11. The computer-implemented method of claim 7, wherein the set of packets are received at a respective port of the network interface, wherein the network interface includes a plurality of ports.

12. The computer-implemented method of claim 7, wherein the current threshold value comprises a predetermined value or a predicted median percentile latency value according to an expected latency throughout a network.

13. A non-transitory computer-readable medium including instructions stored therein that, when executed by at least one computing device, cause the at least one computing device to:
receive a first set of packets at a network interface;
determine a number of packets, from the first set of packets, that are received with a latency value below a current threshold value;
determine whether a first ratio of packets below the current threshold value is less than a target ratio value, wherein the target ratio value is provided as a latency percentile;
in response to determining that the first ratio is less than the target ratio value, increment the current threshold value by a product of a maximum latency value, a difference of the target ratio value and the first ratio, and a gain setting, wherein the gain setting indicates a magnitude for adjusting the current threshold value; and
in response to determining that the first ratio is not less than the target ratio value, decrementing the current threshold value by a product of a maximum latency value, a difference between the first ratio and the target ratio value, and a gain setting, wherein the gain setting indicates a magnitude for adjusting the current threshold value.

14. The non-transitory computer-readable medium of claim 13, wherein the set of packets comprises an interval of packets, wherein the interval of packets represents an amount of packets received during a first period of time.

15. The non-transitory computer-readable medium of claim 13, wherein the instructions further cause the at least one computing device to:
determine whether a remaining period of time remains in a total amount of time for receiving packets.

16. The non-transitory computer-readable medium of claim 13, wherein the instructions further cause the at least one computing device to:
receive a second set of packets at the network interface.

17. The non-transitory computer-readable medium of claim 13, wherein the set of packets are received at a respective port of the network interface, wherein the network interface includes a plurality of ports.

* * * * *